United States Patent
Ting et al.

(10) Patent No.: US 8,304,478 B2
(45) Date of Patent: Nov. 6, 2012

(54) POLYAMIDE/POLY(ARYLENE ETHER) COMPOSITION, ARTICLE, AND METHOD

(75) Inventors: Sai-Pei Ting, Slingerlands, NY (US); Masazumi Furukawa, Hachioji (JP); Sho Sato, Utsunomiya (JP); Mikio Sawaji, Utsunomiya (JP)

(73) Assignee: Sabic Innovative Plastics IP B.V. (NL)

( * ) Notice: Subject to any disclaimer, the term of this patent is extended or adjusted under 35 U.S.C. 154(b) by 185 days.

(21) Appl. No.: 12/847,134

(22) Filed: Jul. 30, 2010

(65) Prior Publication Data

US 2012/0029129 A1 Feb. 2, 2012

(51) Int. Cl.
*C08K 5/101* (2006.01)
*C08K 5/098* (2006.01)

(52) U.S. Cl. .......................... 524/318; 524/398; 524/399

(58) Field of Classification Search .................. 524/318, 524/398, 399, 400
See application file for complete search history.

(56) References Cited

U.S. PATENT DOCUMENTS

| | | |
|---|---|---|
| 2,071,250 A | 7/1931 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,431,323 A | 3/1969 | Jones |
| 4,600,752 A | 7/1986 | Meyer et al. |
| 4,918,148 A | 4/1990 | Meyer et al. |
| 4,970,272 A | 11/1990 | Gallucci |
| 5,132,365 A | 7/1992 | Gallucci |
| 5,164,440 A | 11/1992 | Deguchi et al. |
| 5,183,843 A | 2/1993 | Sakai et al. |
| 5,470,902 A | 11/1995 | Kubo et al. |
| 6,410,638 B1 * | 6/2002 | Kaufhold et al. ............. 524/507 |
| 6,593,411 B2 | 7/2003 | Koevoets et al. |
| 7,226,963 B2 | 6/2007 | Koevoets et al. |
| 7,235,612 B2 | 6/2007 | Kobayashi et al. |
| 7,268,190 B2 | 9/2007 | Ohme et al. |
| 7,358,292 B2 | 4/2008 | Miyoshi et al. |
| 7,385,013 B2 | 6/2008 | Kobayashi et al. |
| 7,462,672 B2 | 12/2008 | Kobayashi et al. |
| 7,550,541 B2 | 6/2009 | Ohme et al. |
| 7,655,734 B2 | 2/2010 | Zamoch et al. |
| 2003/0171503 A1 | 9/2003 | Adedeji et al. |
| 2003/0181584 A1 | 9/2003 | Handlin, Jr. |
| 2004/0034152 A1 | 2/2004 | Oka et al. |
| 2004/0063857 A1 | 4/2004 | Vathauer et al. |
| 2005/0260397 A1* | 11/2005 | Ohlinger et al. ............. 428/304.4 |
| 2009/0146109 A1 | 6/2009 | Elkovitch et al. |
| 2009/0275678 A1 | 11/2009 | Kumazawa et al. |
| 2010/0063191 A1 | 3/2010 | Hirono |
| 2010/0160507 A1 | 6/2010 | Bauer et al. |

FOREIGN PATENT DOCUMENTS

| | | |
|---|---|---|
| CA | 2020301 A1 | 1/1991 |
| EP | 1842879 A1 | 10/2007 |

OTHER PUBLICATIONS

Clariant, Additives for Plastics, General leaflet, product range for polymer additives, waxes and flame retardants, Pigments & Additives Division Plastic Business, Edition: May 2006, 12 pages.
Clariant, Additives for the Processing of Injection Moulded Polyamides, Downloaded Jul. 14, 2010, 45 pages.
ASTM D 648-07, Standard Test Method for Deflection Temperature of Plastics Under Flexural Load in the Edgewise Position, Downloaded: Jan. 12, 2009, 13 pages.
ASTM D1238-10, Standard Test Method for Melt Flow Rates of Thermoplastics by Extrusion Plastometer, Downloaded Oct. 27, 2010, 15 pages.
ASTM D256-10, Standard Test Method for Determining the Izod Pendulum Impact Resistance of Plastics, Downloaded: Oct. 27, 2010, 20 pages.
ASTM D638-10, Standard Test Method for Tensile Properties of Plastics, Downloaded: Oct. 27, 2010, 16 pages.
ASTM D790-10, Standard Test Methods for Flexural Properties of Unreinforced and Reinforced Plastics and Electrical Insulating Materials, Downloaded: Oct. 27, 2010, 11 pages.
Clariant, Clariant Pigments and Additives for Polyamides, Downloaded Jul. 14, 2010, 79 pages.
Clariant, Licowax, Licolub, Licomont, for the Processing of Engineering Resins, Downloaded Jul. 14, 2010, 49 pages.
Clariant, Licowax, Ceridust, Licolub, Licomont, General leaflet—Waxes, Pigments & Additives Division, Edition: Jun. 2007, 36 pages.
International Standard, ISO 3681, Binders for paints and varnishes—Determination of saponification value—Titrimetric method, 1996, 8 pages.
JP 57165433, Publication date: Oct. 12, 1982, Abstract, 1 page.
JP 2001302905, Publication date: Oct. 31, 2001, Abstract, 1 page.
JP 2004174739, Publication date: Jun. 24, 2004, Abstract, 1 page.
JP 2007133391, Publication date: May 31, 2007, Abstract, 1 pages.
Clariant Product Data Sheet—Waxes, Licowax OP Flakes, http://www.pa.clariant.com/C1256A2A001CDFF0/all/F493F9A3F6185A7AC1256A320064320F?openDocument&CSS=PDSprint, Edition Jan. 5, 2010, 1 page.
Clariant, Licowax—Raw materials for technical wax dispersions, Edition: Nov. 2002/W 258 GB, 20 pages.
Clariant, Lubricants for Plastics Processing, Edition: Feb. 2004/W 274 GB/Tr, 8 pages.
BASF, Luwax OP Powder Luwax OP Flakes, Technical Information, Feb. 2005, 8 pages.

(Continued)

*Primary Examiner* — Tae H Yoon
(74) *Attorney, Agent, or Firm* — Cantor Colburn LLP

(57) ABSTRACT

A polyamide-poly(arylene ether) composition is prepared by melt blending specific amounts of components including a polyamide, a poly(arylene ether), a hydrogenated block copolymer of an alkenyl aromatic monomer and a conjugated diene, a compatibilizing agent, and partially saponified ester of a $C_{16}$-$C_{36}$ aliphatic carboxylic acid and a $C_2$-$C_{12}$ aliphatic alcohol. The composition is useful for molding articles that have a significantly reduced incidence of the cosmetic defect known as "silver streaks".

20 Claims, 5 Drawing Sheets

OTHER PUBLICATIONS

Clariant, Montan Waxes for Plastics Processing, Edition: Jun. 1999/W 273 GB, 16 pages.

Clariant, Licowax, Licolub, Licomont, for the processing of engineering thermoplastics—General leaflet, Pigments & Additives Division Plastic Business, Edition: Jan. 2007, 20 pages.

Plastics Additives Handbook, 5th Edition, Edited by Dr. Hans Zweifel, Faxed: Jul. 21, 2010, 14 pages.

Clariant, Polymer Additives for the Plastics Industry, Overview, Edition: Oct. 2004/K 100 GB, 12 pages.

Clariant, Waxes by Clariant, Production, characteristic, and applications, Edition: May 2003/W 320 GB, 104 pages.

Clariant Product Data Sheet, Licowax E Flakes, http://www.pa.clariant.com/pa/pds5.nsf/ f430e17828a71cf9c1257211002eb108/ 99ac544b6d8d2a51c12570eb00300d47l0penDocument, Edition Apr. 2, 2008, 1 page.

International Application No. PCT/US2011/041961; International Filing Date Jun. 27, 2011; International Search Report, Date of Mailing Feb. 29, 2012; 5 pages.

International Application No. PCT/US2011/041961; International Filing Date Jun. 27, 2011; Written Opinion of the International Searching Authority, 4 pages.

* cited by examiner

US 8,304,478 B2

POLYAMIDE/POLY(ARYLENE ETHER) COMPOSITION, ARTICLE, AND METHOD

BACKGROUND OF THE INVENTION

Poly(arylene ether) resins have been blended with polyamide resins to provide compositions having a wide variety of beneficial properties such as heat resistance, chemical resistance, impact strength, hydrolytic stability, and dimensional stability. One application of polyamide-poly(arylene ether) blends is the molding of automotive under-the-hood components, such as power distribution boxes, relay boxes, and junction boxes. These under-the-hood components typically have thin walls (normally less than 1 millimeter) and a complex configuration that requires a plastic with high flow and high impact resistance. While meeting these stringent property requirements, existing commercial grades of polyamide-poly(arylene ether) blends used for this purpose have sometimes yielded molded parts with a cosmetic defect known as "silver streaks" or simply "streaks". Although not affecting the structural integrity of the molded parts, the silver streaks are objectionable to customers, and parts exhibiting silver streaks are therefore unsuitable for sale. There is therefore a desire to understand the cause of the silver streaks and to formulate polyamide-poly(arylene ether) blends with a significantly reduced propensity to form silver streaks during molding.

BRIEF DESCRIPTION OF THE INVENTION

One embodiment is a compatibilized polyamide-poly(arylene ether) composition, comprising the product of melt blending components comprising: about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

Another embodiment is a compatibilized polyamide-poly(arylene ether) composition, obtainable by a process comprising melt blending: about 40 to about 75 weight percent of a polyamide; about 25 to about 55 weight percent of a poly(arylene ether); about 2 to about 10 weight percent of a hydrogenated block copolymer; about 0.2 to about 2 weight percent of a compatibilizing agent; and about 0.1 to about 0.5 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

Another embodiment is an article comprising one of the compatibilized polyamide-poly(arylene ether) compositions.

Another embodiment is a method of reducing cosmetic imperfections in a surface of an injection molded article comprising a compatibilized polyamide-poly(arylene ether) composition, the method comprising: injection molding a compatibilized polyamide-poly(arylene ether) composition to form an injection molded article; wherein the compatibilized polyamide-poly(arylene ether) composition is the product of melt blending components comprising about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

These and other embodiments are described in detail below.

DETAILED DESCRIPTION OF THE INVENTION

Figure 1:
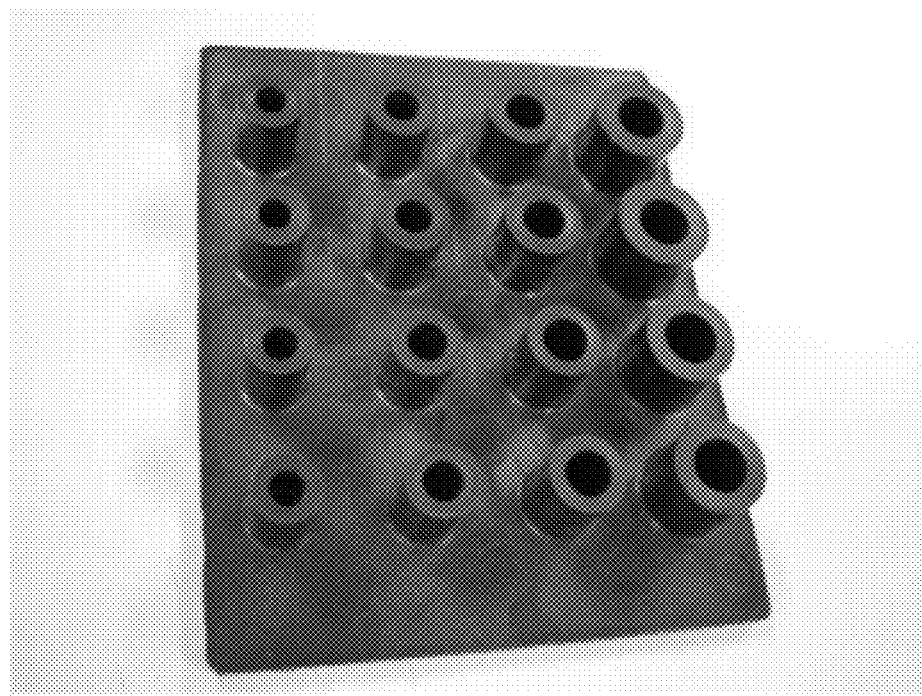
FIG. 1 is an image of a multiple boss tool used for measurements of mold release pressure.

The present inventors have discovered that the propensity of a polyamide-poly(arylene ether) blend to form silver streaks during injection molding is significantly reduced when the polyamide-poly(arylene ether) blend is the product of melt blending particular amounts of a polyamide, a poly(arylene ether), a hydrogenated block copolymer of an alkenyl aromatic monomer and a conjugated diene, a compatibilizing agent, and a partially saponified ester of a $C_{16}$-$C_{36}$ aliphatic carboxylic acid and a $C_2$-$C_{12}$ aliphatic alcohol. This result is particularly surprising given the substantially worse performance of compositions containing chemically related mold release agents. It is also important that the cosmetic advantages of the compositions containing partially saponified fatty acid esters are achieved without significantly compromising the physical properties of the corresponding molded articles.

One embodiment is a compatibilized polyamide-poly(arylene ether) composition, comprising the product of melt blending components comprising: about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition (unless a different weight basis is specified).

A polyamide is used to form the compatibilized polyamide-poly(arylene ether) composition. Polyamides, also known as nylons, are characterized by the presence of a plurality of amide (—C(O)NH—) groups, and are described in U.S. Pat. No. 4,970,272 to Gallucci. Suitable polyamide resins include polyamide-6, polyamide-6,6, polyamide-4, polyamide-4,6, polyamide-12, polyamide-6,10, polyamide 6,9, polyamide-6,12, amorphous polyamide resins, polyamide 6/6T and polyamide 6,6/6T with triamine contents below 0.5 weight percent, polyamide 9T, and combinations thereof. In some embodiments, the polyamide resin comprises polyamide-6,6. In some embodiments, the polyamide resin comprises polyamide-6,6. In some embodiments, the polyamide resin or combination of polyamide resins has a melting point ($T_m$) greater than or equal to 171° C. When the polyamide comprises a super tough polyamide, that is, a rubber-toughened polyamide, the composition may or may not contain a separate impact modifier.

Polyamides may be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamide resins are commercially available from a variety of sources.

In some embodiments, the polyamide has a relative viscosity of about 30 to about 60. Relative viscosity is determined according to DIN 53727 in a 1 weight percent solution in 90 weight percent formic acid.

In some embodiments, the polyamide resin comprises a polyamide having an amine end group concentration greater than or equal to 35 microequivalents amine end group per gram of polyamide (μeq/g) as determined by titration with hydrochloric acid. The amine end group concentration may be greater than or equal to 40 μeq/g, more specifically about 40 to about 70 μeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The amount of polyamide used to prepare the compatibilized polyamide-poly(arylene ether) composition is about 40 to about 75 weight percent; based on the total weight of the compatibilized polyamide-poly(arylene ether) composition. Within this range, the polyamide amount can be about 50 to about 70 weight percent, specifically about 55 to about 65 weight percent.

The poly(arylene ether) used to form the compatibilized polyamide-poly(arylene ether) composition comprises repeating structural units of the formula

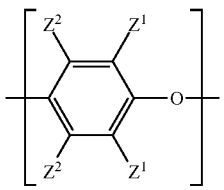

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present.

The poly(arylene ether) can be in the form of a homopolymer, a copolymer, a graft copolymer, an ionomer, or a block copolymer, as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) consists of poly(2,6-dimethyl-1,4-phenylene ether). In this context, the term "consists of" excludes the reaction products of poly(arylene ether)s and functionalizing agents, such as acid-functionalized poly(arylene ether)s and anhydride-functionalized poly(arylene ether)s.

The poly(arylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese or cobalt compounds, usually in combination with one or more ligands such as a secondary amine, tertiary amine, halide or combination of two or more of the foregoing.

In some embodiments, the poly(arylene ether) has an intrinsic viscosity of about 0.2 to about 1.0 deciliter per gram, as measured by ubbelohde viscometer in chloroform at 25° C. In some embodiments, the poly(arylene ether) has an intrinsic viscosity of about 0.3 to about 0.6 deciliter per gram. When the poly(arylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units.

The amount of poly(arylene ether) used to prepare the compatibilized polyamide-poly(arylene ether) composition is about 25 to about 55 weight percent, based on the total weight of the compatibilized polyamide-poly(arylene ether) composition. Within this range, the poly(arylene ether) amount can be about 27 to about 50 weight percent, specifically about 27 to about 40 weight percent, more specifically about 27 to about 35 weight percent.

In addition to a polyamide and a poly(arylene ether), a hydrogenated block copolymer of an alkenyl aromatic monomer and a conjugated diene is used to prepare the compatibilized polyamide-poly(arylene ether) composition. Methods for making high molecular weight hydrogenated block copolymers are known in the art and described, for example, in U.S. Pat. No. 3,431,323 to Jones. High molecular weight hydrogenated block copolymers are also commercially available as, for example, the polystyrene-poly(ethylene/butylene)-polystyrene triblock copolymer having a styrene content of 31 weight percent based and a weight average molecular weight of about 240,000 to about 301,000 atomic mass units (AMU) available from Kraton Polymers as KRATON G 1651, and the polystyrene-poly(ethylene/butylene)-polystyrene triblock copolymer having a styrene content of 31 weight percent based and a weight average molecular weight of about 350,000 to about 450,000 atomic mass units (AMU) available from Kraton Polymers as KRATON MD6933ES.

The alkenyl aromatic monomer used to prepare the hydrogenated block copolymer can have the structure

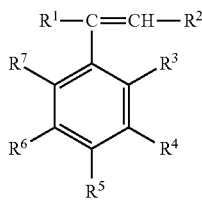

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene. In some embodiments, the poly(alkenyl aromatic) content of the hydrogenated block copolymer is about 10 to about 40 weight percent, specifically about 20 to about 40 weight percent, based on the weight of the hydrogenated block copolymer. In other embodiments, the poly(alkenyl aromatic) content of the hydrogenated block copolymer is about 40 to about 75 weight percent, specifically about 55 to about 75 weight percent, based on the weight of the hydrogenated block copolymer.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic monomer and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. Method of preparing tapered block copolymers, which may also be referred to as controlled distribution block copolymers, are described, for example, in U.S. Patent Application No. US 2003/181584 A1 of Handlin et al. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing six or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

Methods of preparing block copolymers are known in the art and many hydrogenated block copolymers are commercially available. Illustrative commercially available hydrogenated block copolymers include the polystyrene-polyethylene-propylene) diblock copolymers available from Kraton Polymers as Kraton G1701 and G1702; the polystyrene-poly (ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S—S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more block copolymers may be used.

In some embodiments, the hydrogenated block copolymer is a polystyrene-poly(ethylene-butylene)-polystyrene triblock copolymer. This block copolymer does not include the residue of any functionalizing agents or any monomers other than those indicated by their names.

In some embodiments, the hydrogenated block copolymer excludes the residue of monomers other than the alkenyl aromatic monomer and the conjugated diene.

In some embodiments, the hydrogenated block copolymer excludes the residue of acid functionalizing agents, such as maleic anhydride. In some embodiments, the hydrogenated block copolymer consists of blocks derived from the alkenyl aromatic monomer and the conjugated diene. It does not comprise grafts formed from these or any other monomers. It also consists of carbon and hydrogen atoms and therefore excludes heteroatoms.

The composition comprises the hydrogenated block copolymer in an amount of about 2 to about 10 weight percent, specifically about 3 to about 8 weight percent, more specifically about 4 to about 8 weight percent, based on the total weight of the compatibilized polyamide-poly(arylene ether) composition.

In addition to a polyamide, a poly(arylene ether), and a hydrogenated block copolymer, a compatibilizing agent is used to prepare the compatibilized polyamide-poly(arylene ether) composition. As used herein, the term "compatibilizing agent" refers to a polyfunctional compound that interacts with the poly(arylene ether), the polyamide, or both. This interaction may be chemical (for example, grafting) and/or physical (for example, affecting the surface characteristics of the dispersed phases). In either instance the resulting compatibilized blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that may be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. No. 5,132,365 to Gallucci, and U.S. Pat. Nos. 6,593,411 and 7,226,963 to Koevoets et al.

In some embodiments, the compatibilizing agent comprises a polyfunctional compound. Polyfunctional compounds that may be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with —NH$_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents may be added directly to the melt blend or pre-reacted with either or both of the poly(arylene ether) and the polyamide, as well as with any other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with and consequently functionalize the poly(arylene ether). For example, the poly(arylene ether) may be pre-reacted with maleic anhydride to form an anhydride-functionalized poly(arylene ether) that has improved compatibility with the polyamide compared to a non-functionalized poly(arylene ether).

Where a compatibilizing agent is employed in the preparation of the compatibilized polyamide-poly(arylene ether) composition, the amount used will be dependent upon the specific compatibilizing agent chosen and the specific polymeric system to which it is added. In some embodiments, the compatibilizing agent amount is about 0.2 to about 2 weight percent, specifically about 0.4 to about 1 weight percent, based on the total weight of the compatibilized polyamide-poly(arylene ether) composition.

In addition to a polyamide, a poly(arylene ether), a hydrogenated block copolymer, and a compatibilizing agent, a partially saponified ester of a $C_{16}$-$C_{36}$ aliphatic carboxylic acid and a $C_2$-$C_{12}$ aliphatic alcohol is used to prepare the compatibilized polyamide-poly(arylene ether) composition. The term "partially saponified ester" means that one equivalent of an ester has been reacted with less than one equivalent of a metal hydroxide to form a mixture comprising residual ester starting material and a metal salt of the acid component of the ester. An example of a partial saponification of an ester is shown in the chemical scheme below, where one equivalent of a montanate diester of 1-methyl-1,3-propanediol is partially hydrolyzed using half an equivalent of calcium hydroxide to form a mixture of calcium montanate, 1-methyl-1,3-propanediol, and residual montanate diester:

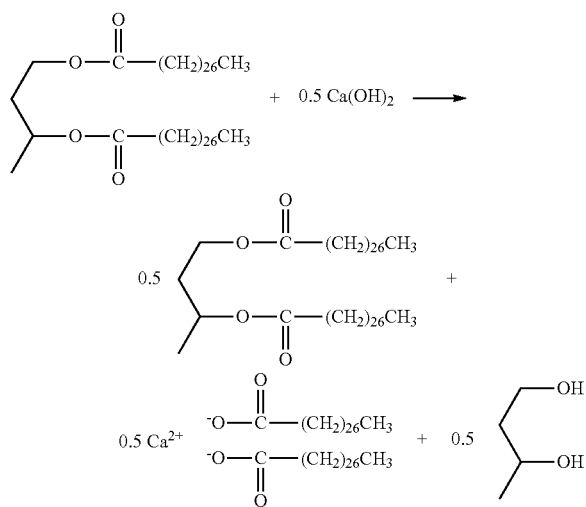

The ester comprises the residue of a $C_{16}$-$C_{36}$ aliphatic carboxylic acid. In some embodiments, the $C_{16}$-$C_{36}$ aliphatic carboxylic acid comprises a $C_{16}$-$C_{24}$ aliphatic carboxylic acid, such as stearic acid. In some embodiments, the $C_{16}$-$C_{36}$ aliphatic carboxylic acid comprises a $C_{24}$-$C_{36}$ aliphatic carboxylic acid, such as montanic acid. In some embodiments, the $C_{16}$-$C_{36}$ aliphatic carboxylic acid comprises a fully saturated acid, i.e., an aliphatic carboxylic acid that is free of aliphatic unsaturation. In other embodiments, the $C_{16}$-$C_{36}$ aliphatic carboxylic acid comprises an aliphatic acid comprising one or more aliphatic unsaturations, which can be aliphatic carbon-carbon double bonds or aliphatic carbon-carbon triple bonds. In some embodiments, the $C_{16}$-$C_{36}$ aliphatic carboxylic acid comprises a linear, fully saturated acid having the structure $CH_3(CH_2)_n COOH$, where n is 14 to 34. In some embodiments, the $C_{16}$-$C_{36}$ aliphatic carboxylic acid comprises stearic acid, i.e., $CH_3(CH_2)_{16}COOH$. In some embodiments, the $C_{16}$-$C_{36}$ aliphatic carboxylic acid comprises montanic acid, i.e., $CH_3(CH_2)_{26}COOH$. When the saponified ester is derived from processing of raw montan wax, it is understood that it can contain $C_{24}$-$C_{36}$ aliphatic carboxylic acids of varying chain lengths.

The ester comprises the residue of a $C_2$-$C_{12}$ aliphatic alcohol. The $C_2$-$C_{12}$ aliphatic alcohol can include one, two, or more than two hydroxy groups. When the $C_2$-$C_{12}$ aliphatic alcohol comprises one hydroxy group it can be, for example, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 2-methyl-2-butanol, 3-methyl-2-butanol, cyclopentanol, cyclohexanol, 1-methylcyclopentanol, and the like. In some embodiments, the $C_2$-$C_{12}$ aliphatic alcohol comprises a $C_2$-$C_{12}$ aliphatic diol. Examples of $C_2$-$C_{12}$ aliphatic diols include ethylene glycol, 1,2-propanediol, 1,3-propanediol, 1-methyl-1,3-propanediol, 2-methyl-1,3-propanediol, 1,2-butanediol, 1,3-butanediol, 1,4-butanediol, 1,2-cyclohexanediol, and the like. In some embodiments, the $C_2$-$C_{12}$ aliphatic alcohol is selected from the group consisting of ethylene glycol, 1-methyl-1,3-propanediol, and mixtures thereof.

As described above, the partially saponified ester includes a metal salt of the acid component of the ester. In some embodiments, the partially saponified ester comprises a fatty acid salt selected from the group consisting of a calcium salt of the $C_{16}$-$C_{36}$ aliphatic carboxylic acid, a sodium salt of the $C_{16}$-$C_{36}$ aliphatic carboxylic acid, a potassium salt of the $C_{16}$-$C_{36}$ aliphatic carboxylic acid, a zinc salt of the $C_{16}$-$C_{36}$ aliphatic carboxylic acid, a magnesium salt of the $C_{16}$-$C_{36}$ aliphatic carboxylic acid, an aluminum salt of the $C_{16}$-$C_{36}$ aliphatic carboxylic acid, and combinations thereof. In some embodiments, the partially saponified ester comprises a calcium salt of the $C_{16}$-$C_{36}$ aliphatic carboxylic acid.

In some embodiments, the partially saponified ester comprises about 5 to about 60 weight percent of the fatty acid salt, based on the weight of the partially saponified ester. Within the range of about 5 to about 60 weight percent, the amount of the fatty acid salt can be about 10 to about 50 weight percent, specifically about 15 to about 40 weight percent, more specifically about 20 to about 30 weight percent. The partially saponified ester can be obtained by partial saponification of the ester, or by simply blending the ester with a corresponding acid salt, and optionally a corresponding free acid. In some embodiments, the partially saponified ester comprises about 45 to about 70 weight percent of montanic acid esters (CAS Registry No. 73138-44-0), about 15 to about 45 weight percent of montan wax fatty acid calcium salts (CAS Registry No. 68308-22-5), optionally about 5 to about 20 weight percent of montan wax (CAS Registry No. 8002-53-7), and optionally about 5 to about 25 weight percent of montan wax fatty acids (CAS Registry No. 68476-03-9).

Thermogravimetric analysis is a useful tool for estimating the degree of saponification of the partially saponified ester. Specifically, the residue at 700° C. is an indicator of the degree of saponification, which can be estimated by comparing the 700° C. residue amount of a partially saponified ester to the corresponding residue amounts of the unsaponified ester and the corresponding acid salt. This technique is illustrated in with working examples. In some embodiments, thermogravimetric analysis of the partially saponified ester in air over a temperature range of 25 to 700° C. yields a residue of about 1 to about 6 weight percent, based on the initial weight of the partially saponified ester. Within the range of about 1 to about 6 weight percent, the residue amount can be about 1.5 to bout 4.5 weight percent, specifically about 2 to about 3 weight percent.

Methods for the preparation of partially saponified esters are known in the art. For example, partially saponified montanic ester waxes can be prepared by processing steps including bleaching of raw montan wax with chromic acid solution to form refined montan wax; saponification and oxidation of refined montan wax with chromic acid solution to yield acid waxes; esterification of acid waxes with monoalcohols, dialcohols, or polyalcohols to yield ester waxes; and partial saponification of ester waxes with metal hydroxides to yield partially saponified montanic ester waxes. Partially saponified esters are also commercially available as, for example, LICOWAX OP from Clariant, and LUWAX OP from BASF.

The composition comprises the partially saponified ester in an amount of about 0.1 to about 1 weight percent, specifically about 0.2 to about 0.7 weight percent, more specifically about 0.25 to about 0.4 weight percent, based on the total weight of the compatibilized polyamide-poly(arylene ether) composition.

In some embodiments, the composition further comprises about 0.1 to about 0.5 weight percent, specifically about 0.2 to about 0.4 weight percent, of a fatty acid ester such as pentaerythritol tetrastearate.

In some embodiments, the composition comprises a black pigment. Black-colored articles are often preferred for automotive under-the-hood applications, because they are not easily discolored by dirt, oil, and grime. A particularly suitable black pigment is carbon black. When present, black pigment is typically used in an amount of about 0.05 to about 1 weight percent, specifically about 0.1 to about 0.3 weight percent, based on the total weight of the composition.

The thermoplastic composition can, optionally, further comprise one or more additives such as, for example, stabilizers, mold release agents, processing aids, polyamide flow promoters (for example, low molecular weight polyolefins with or without epoxy functionality, low molecular weight ethylene-propylene rubbers, low molecular weight thermoplastic polyesters, and liquid polyolefin rubbers), poly(arylene ether) flow promoters (for example, low molecular weight homopolystyrenes, and low molecular weight rubber-modified polystyrenes), flame retardants, drip retardants, nucleating agents, UV blockers, dyes, pigments, antioxidants, anti-static agents, blowing agents, mineral oil, metal deactivators, antiblocking agents, nanoclays, electrically conductive agents, and combinations thereof. In some embodiments, the thermoplastic composition comprises one or more flame retardants. Flame retardants include, for example, brominated polymers (such as brominated polystyrene), metal dialkyl phosphinates (such as aluminum tris(diethylphosphinate)), metal hydroxides (such as magnesium hydroxide), and aromatic phosphate esters (such as resorcinol bis(diphenyl phosphate) and bisphenol A bis(diphenyl phosphate)). In some embodiments, the thermoplastic composition comprises less than 0.1 weight percent of or entirely excludes flame retardants.

In some embodiments, the compatibilized polyamide-poly(arylene ether) composition comprises less than 1 weight percent of any polymer other than the polyamide, the poly(arylene ether), and the hydrogenated block copolymer. In some embodiments, the compatibilized polyamide-poly(arylene ether) composition excludes any polymer other than the polyamide, the poly(arylene ether), and the hydrogenated block copolymer.

In some embodiments, the compatibilized polyamide-poly(arylene ether) composition comprises less than 1 weight percent of a filler, specifically less than 0.5 weight percent of a filler, more specifically less than 0.1 weight percent of a filler. In some embodiments, the compatibilized polyamide-poly(arylene ether) composition excludes filler. The term "fillers" includes particulate fillers (e.g., talc), fibrous reinforcements (e.g., glass fibers), and electrically conductive fillers (e.g., conductive carbon black, carbon nanotubes). It will be understood that the limitations on fillers do not apply to pigments, such as carbon black, which have low electrical conductivity and are used primarily for coloration.

In a very specific embodiment, the composition is the product of melt blending components comprising about 55 to about 65 weight percent of the polyamide, about 25 to about 35 weight percent of the poly(arylene ether), about 4 to about 8 weight percent of the hydrogenated block copolymer, about 0.4 to about 1 weight percent of the compatibilizing agent, and about 0.2 to about 0.4 weight percent of the partially saponified ester; the polyamide comprises polyamide-6,6; the poly(arylene ether) comprises poly(2,6-dimethyl-1,4-phenylene ether); the hydrogenated block copolymer comprises a polystyrene-poly(ethylene-butylene)-polystyrene having a polystyrene content of about 20 to about 40 weight percent, based on the weight of the polystyrene-poly(ethylene-butylene)-polystyrene; the compatibilizing agent comprises citric acid; the $C_{16}$-$C_{36}$ aliphatic carboxylic acid comprises montanic acid; the $C_2$-$C_{12}$ aliphatic alcohol is selected from the group consisting of ethylene glycol, 1-methyl-1,3-propanediol, and mixtures thereof; the partially saponified ester comprises a calcium salt of the $C_{16}$-$C_{36}$ aliphatic carboxylic acid; and the composition comprises less than or equal to 1 weight percent of a filler.

Another embodiment is a compatibilized polyamide-poly(arylene ether) composition, obtainable by a process comprising melt blending: about 40 to about 75 weight percent of a polyamide; about 25 to about 55 weight percent of a poly(arylene ether); about 2 to about 10 weight percent of a hydrogenated block copolymer; about 0.2 to about 2 weight percent of a compatibilizing agent; and about 0.1 to about 0.5 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition. All of the compositional variations described above apply as well to the compatibilized polyamide-poly(arylene ether) composition obtainable by the specified process.

In addition to reducing the occurrence of silver streaks in injection molded articles, the composition exhibits desirable physical properties. For example, in some embodiments, the composition exhibits an Izod notched impact strength of at least 150 joules per meter, specifically 150 to about 250 joules per meter, more specifically 150 to about 230 joules per meter. As another example, in some embodiments, the composition exhibits a melt flow index of at least 55 grams per 10 minutes, specifically 55 to about 80 grams per 10 minutes, as measured according to ASTM 1238-10 at 280° C. and 5 kilogram load.

All of the above-described compositions are useful for forming articles. Suitable article-forming techniques include injection molding and extrusion. The compositions are particularly useful for injection molding of automotive under-the-hood components, such as power distribution boxes, relay boxes, and junction boxes.

One embodiment is a method of reducing cosmetic imperfections in a surface of an injection molded article comprising a compatibilized polyamide-poly(arylene ether) composition, the method comprising: injection molding a compatibilized polyamide-poly(arylene ether) composition to form an injection molded article; wherein the compatibilized polyamide-poly(arylene ether) composition is the product of melt blending components comprising about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition. All of the variations described above in the context of compositions apply as well to the method of reducing cosmetic imperfections.

The invention includes at least the following embodiments:

EMBODIMENT 1

A compatibilized polyamide-poly(arylene ether) composition, comprising the product of melt blending components comprising: about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

EMBODIMENT 2

The compatibilized polyamide-poly(arylene ether) composition of embodiment 1, wherein the $C_{16}$-$C_{36}$ aliphatic carboxylic acid comprises a $C_{16}$-$C_{24}$ aliphatic carboxylic acid.

EMBODIMENT 3

The compatibilized polyamide-poly(arylene ether) composition of embodiment 1 or 2, wherein the $C_{16}$-$C_{36}$ aliphatic carboxylic acid comprises stearic acid.

EMBODIMENT 4

The compatibilized polyamide-poly(arylene ether) composition of embodiment 1, wherein the $C_{16}$-$C_{36}$ aliphatic carboxylic acid comprises a $C_{24}$-$C_{36}$ aliphatic carboxylic acid.

EMBODIMENT 5

The compatibilized polyamide-poly(arylene ether) composition of embodiment 1 or 4, wherein the $C_{16}$-$C_{36}$ aliphatic carboxylic acid comprises montanic acid.

EMBODIMENT 6

The compatibilized polyamide-poly(arylene ether) composition of any of embodiments 1-5, wherein the $C_2$-$C_{12}$ aliphatic alcohol comprises a $C_2$-$C_{12}$ aliphatic diol.

EMBODIMENT 7

The compatibilized polyamide-poly(arylene ether) composition of any of embodiments 1-6, wherein the $C_2$-$C_{12}$ aliphatic alcohol is selected from the group consisting of ethylene glycol, 1-methyl-1,3-propanediol, and mixtures thereof.

EMBODIMENT 8

The compatibilized polyamide-poly(arylene ether) composition of any of embodiments 1-7, wherein the partially saponified ester comprises a fatty acid salt selected from the group consisting of a calcium salt of the $C_{16}$-$C_{36}$ aliphatic carboxylic acid, a sodium salt of the $C_{16}$-$C_{36}$ aliphatic carboxylic acid, a potassium salt of the $C_{16}$-$C_{36}$ aliphatic carboxylic acid, a zinc salt of the $C_{16}$-$C_{36}$ aliphatic carboxylic acid, a magnesium salt of the $C_{16}$-$C_{36}$ aliphatic carboxylic acid, an aluminum salt of the $C_{16}$-$C_{36}$ aliphatic carboxylic acid, and combinations thereof.

EMBODIMENT 9

The compatibilized polyamide-poly(arylene ether) composition of any of embodiments 1-8, wherein the partially saponified ester comprises about 5 to about 60 weight percent of the fatty acid salt, based on the weight of the partially saponified ester.

EMBODIMENT 10

The compatibilized polyamide-poly(arylene ether) composition of any of embodiments 1-9, wherein thermogravimetric analysis of the partially saponified ester in air over a temperature range of 25 to 700° C. yields a residue of about 1 to about 6 weight percent, based on the initial weight of the partially saponified ester.

EMBODIMENT 11

The compatibilized polyamide-poly(arylene ether) composition of any of embodiments 1-10, wherein the polyamide has an amine end group concentration of about 40 to about 70 microequivalents per gram and a relative viscosity of about 30 to about 60.

EMBODIMENT 12

The compatibilized polyamide-poly(arylene ether) composition of any of embodiments 1-11, wherein the hydrogenated block copolymer has an alkenyl aromatic content of about 20 to about 40 weight percent, based on the weight of the hydrogenated block copolymer.

EMBODIMENT 13

The compatibilized polyamide-poly(arylene ether) composition of any of embodiments 1-12, comprising less than 1 weight percent of a filler.

EMBODIMENT 14

The compatibilized polyamide-poly(arylene ether) composition of any of embodiments 1-13, wherein the composition is the product of melt blending components comprising about 55 to about 65 weight percent of the polyamide, about 25 to about 35 weight percent of the poly(arylene ether), about 4 to about 8 weight percent of the hydrogenated block copolymer, about 0.4 to about 1 weight percent of the compatibilizing agent, and about 0.2 to about 0.4 weight percent of the partially saponified ester; wherein the polyamide comprises polyamide-6,6; wherein the poly(arylene ether) comprises poly(2,6-dimethyl-1,4-phenylene ether); wherein the hydrogenated block copolymer comprises a polystyrene-poly(ethylene-butylene)-polystyrene having a polystyrene content of about 20 to about 40 weight percent, based on the weight of the polystyrene-poly(ethylene-butylene)-polystyrene; wherein the compatibilizing agent comprises citric acid; wherein the $C_{16}$-$C_{36}$ aliphatic carboxylic acid comprises montanic acid; wherein the $C_2$-$C_{12}$ aliphatic alcohol is selected from the group consisting of ethylene glycol, 1-methyl-1,3-propanediol, and mixtures thereof; wherein the partially saponified ester comprises a calcium salt of the $C_{16}$-$C_{36}$ aliphatic carboxylic acid; and wherein the composition comprises less than or equal to 1 weight percent of a filler.

EMBODIMENT 15

A compatibilized polyamide-poly(arylene ether) composition, obtainable by a process comprising melt blending: about 40 to about 75 weight percent of a polyamide; about 25 to about 55 weight percent of a poly(arylene ether); about 2 to about 10 weight percent of a hydrogenated block copolymer; about 0.2 to about 2 weight percent of a compatibilizing agent; and about 0.1 to about 0.5 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

EMBODIMENT 16

An article comprising the compatibilized polyamide-poly(arylene ether) composition of embodiment 1.

EMBODIMENT 17

An automotive under-the-hood component comprising the compatibilized polyamide-poly(arylene ether) composition of embodiment 14.

EMBODIMENT 18

A method of reducing cosmetic imperfections in a surface of an injection molded article comprising a compatibilized polyamide-poly(arylene ether) composition, the method comprising: injection molding a compatibilized polyamide-poly(arylene ether) composition to form an injection molded article; wherein the compatibilized polyamide-poly(arylene ether) composition is the product of melt blending components comprising about 40 to about 75 weight percent of a polyamide; about 25 to about 55 weight percent of a poly(arylene ether); about 2 to about 10 weight percent of a hydrogenated block copolymer of an alkenyl aromatic monomer and a conjugated diene; about 0.2 to about 2 weight percent of a compatibilizing agent; and about 0.1 to about 1 weight percent of a partially saponified ester of a $C_{16}$-$C_{36}$ aliphatic carboxylic acid and a $C_2$-$C_{12}$ aliphatic alcohol; wherein all weight percents are based on the total weight of the compatibilized polyamide-poly(arylene ether) composition.

EMBODIMENT 19

The method of embodiment 18, wherein the polyamide has an amine end group concentration of about 40 to about 70 microequivalents per gram and a relative viscosity of about 30 to about 60.

EMBODIMENT 20

The method of embodiment 18 or 19, wherein the hydrogenated block copolymer has an alkenyl aromatic content of about 20 to about 40 weight percent, based on the weight of the hydrogenated block copolymer.

EMBODIMENT 21

The method of embodiment 18, wherein the composition is the product of melt blending components comprising about 55 to about 65 weight percent of the polyamide, about 25 to about 35 weight percent of the poly(arylene ether), about 4 to about 8 weight percent of the hydrogenated block copolymer, about 0.4 to about 1 weight percent of the compatibilizing agent, and about 0.2 to about 0.4 weight percent of the partially saponified ester, wherein the polyamide comprises polyamide-6,6; wherein the poly(arylene ether) comprises poly(2,6-dimethyl-1,4-phenylene ether); wherein the hydrogenated block copolymer comprises a polystyrene-poly(ethylene-butylene)-polystyrene having a polystyrene content of about 20 to about 40 weight percent, based on the weight of the polystyrene-poly(ethylene-butylene)-polystyrene; wherein the compatibilizing agent comprises citric acid; wherein the $C_{16}$-$C_{36}$ aliphatic carboxylic acid comprises montanic acid; wherein the $C_2$-$C_{12}$ aliphatic alcohol is selected from the group consisting of ethylene glycol, 1-methyl-1,3-propanediol, and mixtures thereof; wherein the partially saponified ester comprises a calcium salt of the $C_{16}$-$C_{36}$ aliphatic carboxylic acid; and wherein the composition comprises less than or equal to 1 weight percent of a filler.

The invention is further illustrated by the following non-limiting examples.

EXAMPLES 1-3, COMPARATIVE EXAMPLES 1-11

These examples demonstrate that the present composition exhibits good mold release and reduction of the cosmetic defects known as silver streaks.

Components used to form the compositions are summarized in Table 1. The mold release agents have been characterized by thermogravimetric analysis in air as a means of estimating the extent of saponification of the partially saponified fatty acid esters. Thermogravimetric analysis in utilized a Perkin Elmer Pyris 1 TGA analyzer and a heating rate of 20° C. per minute.

TABLE 1

| Component | Description |
| --- | --- |
| PPE | Poly(2,6-dimethyl-1,4-phenylene ether) having an intrinsic viscosity of about 0.4 deciliter per gram as measured in chloroform at 25° C.; obtained from SABIC Innovative Plastics as PPO 640. |
| SEBS | Polystyrene-poly(ethylene-butylene)-polystyrene triblock copolymer having a polystyrene content of about 31 weight percent; obtained as KRATON G1651 from Kraton Polymers. |

TABLE 1-continued

| Component | Description |
| --- | --- |
| Citric acid | Anhydrous citric acid, obtained from Jungbunzlauer G.m.b.H. |
| PELTP | Pentaerythritol tetrakis(3-laurylthioproionate), obtained as SEENOX 412S from Shipro Kasei Kaisha. |
| Antioxidant | Pentaerythritol-tetra-(4-hydroxy-3,5-di-tert-butylphenyl)propionate, obtained as Mark AO-60 from ADEKA Corporation. |
| CuI/KI/PA | A masterbatch containing 3 weight percent cuprous iodide, 10 weight percent potassium iodide, and 87 weight percent polyamide; obtained as MB-241 from Unitika Ltd. |
| PETS | Pentaerythritol tetrastearate, obtained as PETS from FACI SPA. |
| PA-66 | Polyamide-6,6, having an amino end group content of about 40-44 microequivalents per gram, and a relative viscosity of about 34.5-37.5 as measured at 25° C. in 90% formic acid; obtained as Polynil P36/4 from Nilit Ltd. |
| Carbon black | Carbon black, obtained as BLACK PEARLS 800 from Cabot. |
| Ca stearate | Calcium stearate (CAS Reg. No. 1592-23-0); exhibiting, by thermogravimetric analysis in air, an onset temperature of 460° C., a 5 weight percent loss at 400° C., and 10.3 weight percent ash at 700° C.; obtained from Ferro. |
| Ethylene bis(stearamide) | Ethylene bis(stearamide) (CAS Reg. No. 110-30-5); exhibiting, by thermogravimetric analysis in air, an onset temperature of 384° C., a 30 weight percent loss at 400° C., and 0.3 weight percent ash at 700° C.; obtained as LICOWAX CP from Clariant. |
| Stearyl erucamide | Stearyl erucamide (CAS Reg. No. 10094-45-8); exhibiting, by thermogravimetric analysis in air, an onset temperature of 365° C., a 40 weight percent loss at 400° C., and 0.1 weight percent ash at 700° C.; obtained as CRODAMIDE 212 from Croda. |
| Ca montanate | Calcium montanate (CAS Reg. No. 68308-22-5); exhibiting, by thermogravimetric analysis in air, an onset temperature of 470° C., a 10 weight percent loss at 400° C., and 9.6 weight percent ash at 700° C.; obtained as LICOMONT CAV 102 from Clariant. |
| Partially saponified $C_{24}$-$C_{34}$ fatty acid esters | Partially saponified 1-methyl-1,3-propandiol esters of $C_{24}$-$C_{34}$ fatty acid; exhibiting, by thermogravimetric analysis in air, an onset temperature of 342-344° C., a 27-28 weight percent loss at 400° C., and 2.3-2.5 weight percent ash at 700° C.; obtained in powder form as LICOWAX OP P from Clariant. or as LUWAX OP P from BASF. |
| Stearic acid | Stearic acid (CAS Reg. No. 57-11/4); obtained as Emersol 7035 from Cognis. |
| Stearyl stearate | Stearyl stearate (CAS Reg. No. 2778-96-3); obtained as V-SSE from Struktol. |
| Partially saponified stearate esters | Partially saponified stearate esters of polyfunctional alcohols; obtained as LOXIOL G78 from Cognis. |
| Complex ester | A proprietary complex ester obtained as LOXIOL P 1732 from Cognis. |
| SA0830 | A proprietary mold release agent; obtained as SA0830 from Struktol. |
| Glyceryl distearate | Glyceryl distearate (CAS Reg. No. 1323-83-7); obtained as LOXIOL P 1206 from Cognis. |
| Long-chain fatty ketone | A proprietary long-chain fatty ketone; obtained as LOXIOL EP2036-18 from Cognis. |
| $C_{24}$-$C_{34}$ fatty acid esters | Montan wax ethylene esters (CAS Reg. No. 73138-45-1); obtained as LICOWAX E from Clariant. |

Compositions are summarized in Table 2, where component amounts are expressed in parts by weight. Compositions were compounded in a twin-screw extruder using a barrel temperature of 320° C., a screw rotation rate of 330 rotations per minute, a throughput of 150 kilograms per hour, and a melt temperature of 300° C. at the die.

Physical and esthetic properties of the compositions are summarized in Table 2. Measurements of mold release force utilized a multiple boss tool having the shape shown in FIG. 1. The tool has a length of about 100 millimeters, a width of about 80 millimeters, and a depth of about 15 millimeters. The tool was molded using a MEIKI M70C (70 ton) molding machine with a maximum internal pressure of about 105-110 megapascals and a screw diameter of 32 millimeters. The molding machine's extruder used a barrel temperature of 300° C. and a mold tool temperature of 80° C. The machine measures the maximum pressure required to eject the molded part ("Mold release pressure (kg/cm$^2$)" in Table 2). "Change in mold release pressure vs. C. Ex. 1 (%)" values in Table 2 are used to compare mold release pressures for compositions containing mold release agents to the value for the mold release-free Comparative Example 1 composition. Lower (more negative) values of "change in mold release pressure" are desirable.

Figure 2:
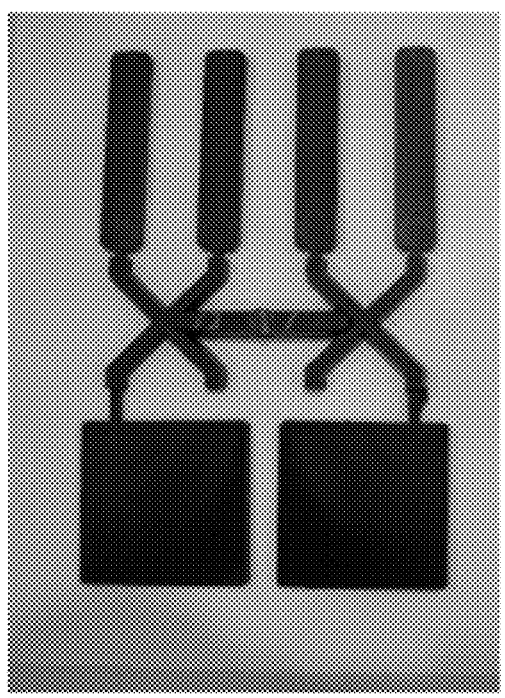
FIG. 2 is an image of a molded part, portions of which (i.e., the plaques) are used for evaluation of silver streaks.
Figure 3:
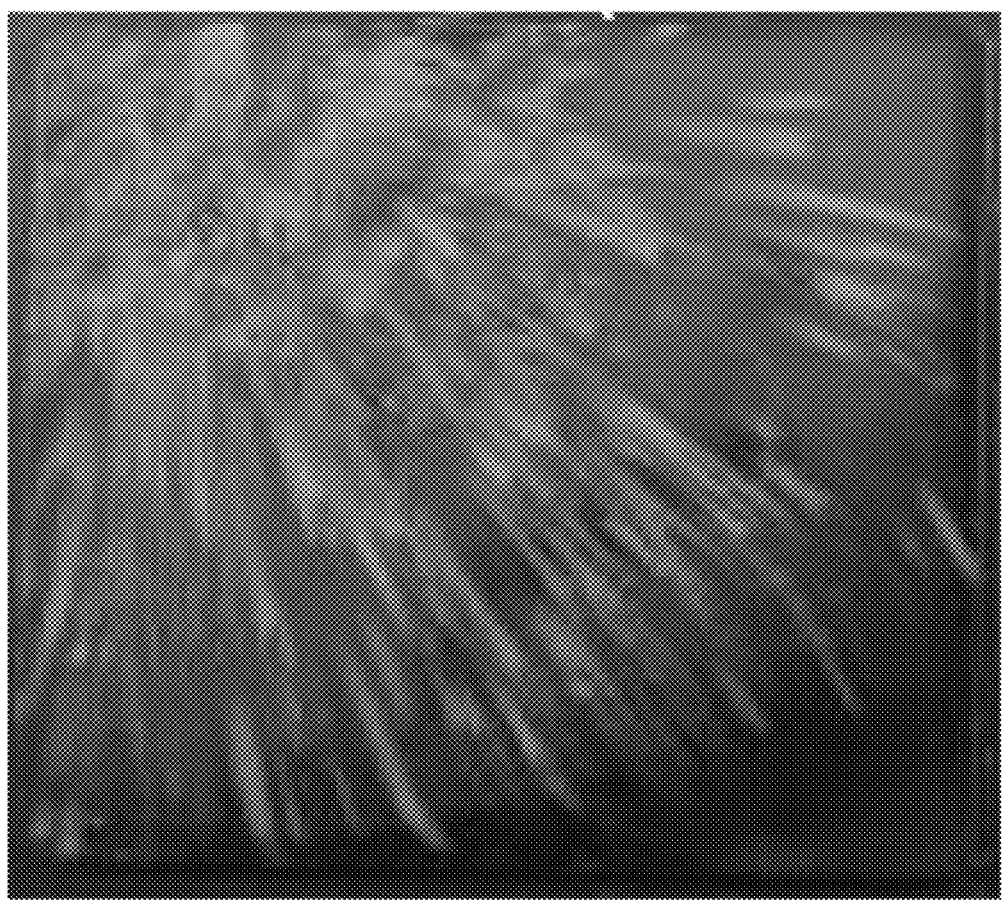
FIG. 3. is an image of a plaque molded from a composition comprising about 0.1 weight percent calcium stearate.
Figure 4:
FIG. 4 is an image of a plaque molded from a composition comprising about 0.1 weight percent calcium montanate.
Figure 5:
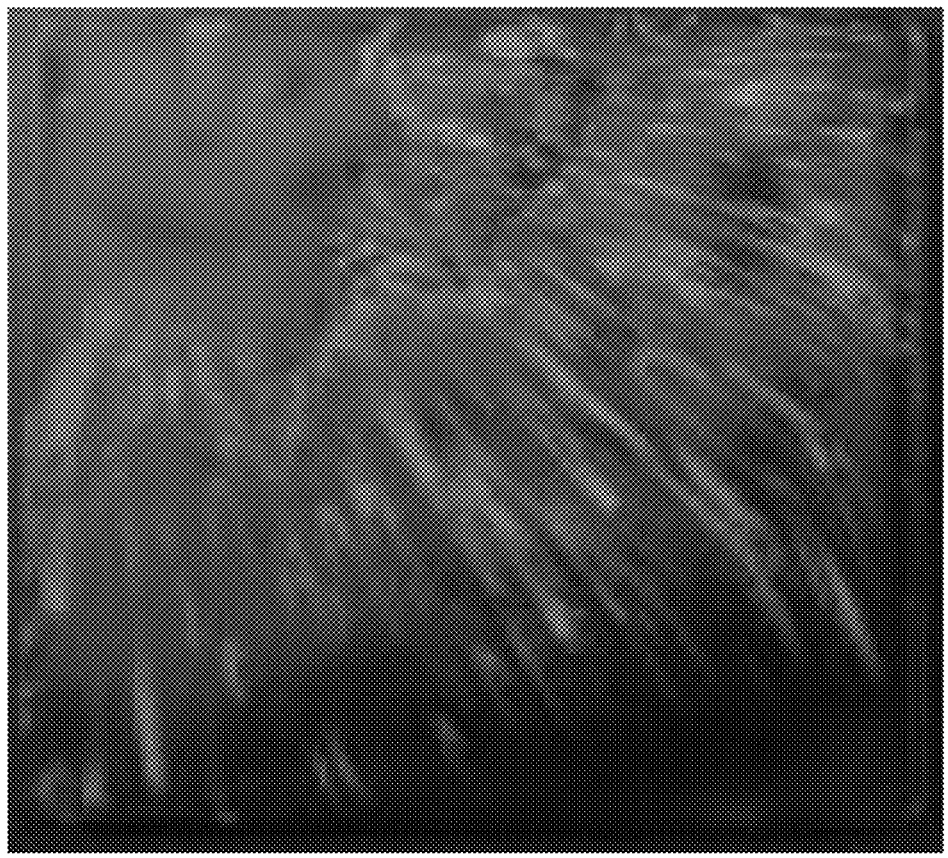
FIG. 5 is an image of a plaque molded from a composition comprising about 0.3 weight percent calcium montanate.
Figure 6:
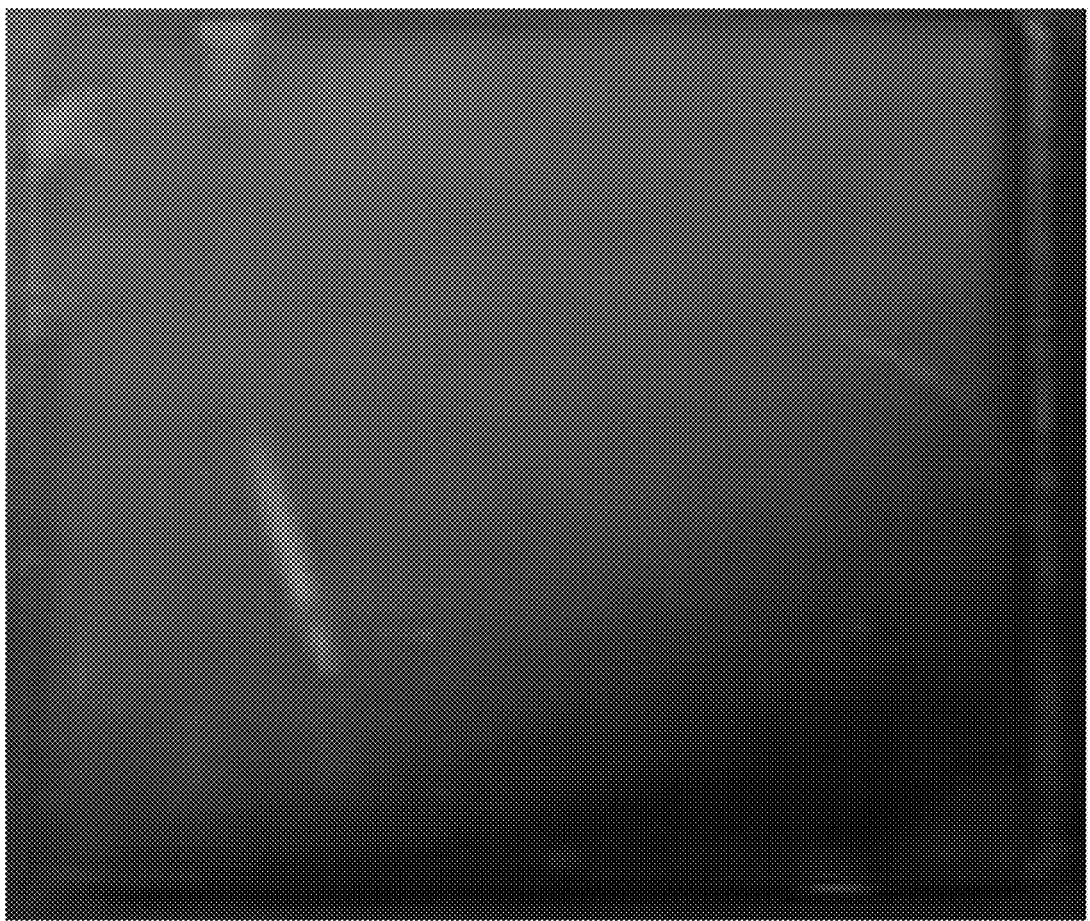
FIG. 6 is an image of a plaque molded from a composition comprising about 0.3 weight percent partially saponified montanate esters.

Esthetic evaluations were performed on 50 millimeter square plaques having a thickness of 3.2 millimeters. An image of a molded sample with two bars and two plaques is presented as FIG. 2. These samples were also molded using the MEIKI M70C (70 ton) molding machine, a barrel temperature of 300° C. and a mold tool temperature of 80° C. The thermoplastic composition was held at 300° C. for twenty minutes before the first sample was molded. This is an abusive molding condition intended to favor the formation of silver streaks. If streaking was observed anywhere on the plaque, a value of "yes" was assigned to the Table 2 property, "Streaking after 20 minute dwell time?". If no streaking or negligible streaking was observed, a value of "nil" was assigned. A more quantitative measure of streaking was performed by dividing the higher gloss face of the plaque into a 10 by 10 grid of 100 squares, and counting the number of squares that included a streaking defect. These results are presented as the Table 2 property, "Percent of area with streaking defect (%)". Images of representative plaques for Comparative Example 6 (containing about 0.1 weight percent calcium stearate), Comparative Example 10 (containing about 0.1 weight percent calcium montanate), Comparative Example 11 (containing about 0.3 weight percent calcium montanate), and Example 2 (containing about 0.3 weight percent partially saponified fatty acid esters) are presented as FIGS. 3-6, respectively.

Melt flow index value were measured at 280° C. and 5 kilogram load according to ASTM 1238-10. Values are presented as "Melt flow index at 280° C., 5 kg (g/10 min)" in Table 2. "Change in melt flow index vs. C. Ex. 1(%)" values in Table 2 are used to compare melt flow index values for compositions containing mold release agents to the value for the mold release-free Comparative Example 1 composition. Higher values of "change in melt flow index" are desirable.

Physical properties (heat distortion temperature, impact strength, tensile strength, and flexural strength and modulus) were measured on bars molded with a separate tool. Heat distortion temperature values were measured according to ASTM D648-07 using a 4.6 kilogram load. Notched Izod impact strength was measured at 23° C. according to ASTM D256-10. Tensile strength was measured at 23° C. according to ASTM D638-10. Flexural strength and flexural modulus were measured at 23° C. according to ASTM D790-10.

The results in Table 2 show that only the Example 1-3 compositions containing partially saponified fatty acid esters provide good mold release and very little streaking under abusive molding conditions. In contrast, the compositions containing calcium salts of fatty acids (Comparative Examples 6-10) exhibit adequate mold release but substantial streaking. And the compositions with fatty acid amides (Comparative Examples 2-5) exhibit marginal mold release properties. Similar studies conducted with a different molding tool also indicated that these compositions produce undesirable silver streaks on the surface of molded articles. The reduction in silver streaks observed with the partially saponified fatty acid esters is particularly surprising given that the use of these materials at about 0.3 weight percent carried with it an amount of calcium montanate that is roughly equivalent to the 0.1 weight percent calcium montanate use in Comparative Example 10, which produced substantial silver streaks. It should also be noted that the cosmetic advantages of the compositions containing partially saponified fatty acid esters are achieved without significantly compromising the physical properties of the corresponding molded articles.

TABLE 2

|  | C. Ex. 1 | C. Ex. 2 | C. Ex. 3 | C. Ex. 4 | C. Ex. 5 |
|---|---|---|---|---|---|
| COMPOSITIONS | | | | | |
| PPE | 29.01 | 29.01 | 29.01 | 29.01 | 29.01 |
| SEBS | 6.50 | 6.50 | 6.50 | 6.50 | 6.50 |
| Citric acid | 0.70 | 0.70 | 0.70 | 0.70 | 0.70 |
| PELTP | 0.50 | 0.50 | 0.50 | 0.50 | 0.50 |
| Antioxidant | 0.50 | 0.50 | 0.50 | 0.50 | 0.50 |
| CuI/KI/PA | 0.50 | 0.50 | 0.50 | 0.50 | 0.50 |
| PETS | 0.30 | 0.30 | 0.30 | 0.30 | 0.30 |
| PA-6,6 | 61.88 | 61.88 | 61.88 | 61.88 | 61.88 |
| Carbon black | 0.2 | 0.2 | 0.2 | 0.2 | 0.2 |
| Stearyl erucamide | 0 | 0.2 | 0.4 | 0 | 0 |
| Ethylene bis(stearamide) | 0 | 0 | 0 | 0.1 | 0.3 |
| Ca stearate | 0 | 0 | 0 | 0 | 0 |
| Ca montanate | 0 | 0 | 0 | 0 | 0 |
| Partially saponified $C_{24}$-$C_{34}$ fatty acid esters | 0 | 0 | 0 | 0 | 0 |
| PROPERTIES | | | | | |
| Mold release pressure (kg/cm$^2$) | 23.7 | 20.5 | 19.3 | — | 17.2 |
| Change in mold release pressure vs. C. Ex. 1 (%) | — | −14 | −19 | — | −27 |
| Streaking after 20 minute dwell time? | — | — | — | — | — |
| Percent of area with streaking defect (%) | — | — | — | — | — |
| Melt flow index at 280° C., 5 kg (g/10 min) | 51 | 73 | 70 | 76 | 74 |
| Change in melt flow index vs. C. Ex. 1 (%) | — | 42 | 36 | 48 | 44 |
| Heat distortion temperature at 4.6 kg (° C.) | 199 | 193 | 190 | 195 | 192 |
| Notched Izod impact strength at 23° C. (J/m) | 140 | 244 | 248 | 218 | 193 |
| Tensile strength at 23° C. (MPa) | 64 | 66 | 65 | 66 | 66 |
| Flexural strength at 23° C. (MPa) | 91 | 92 | 94 | 90 | 93 |
| Flexural modulus at 23° C. (MPa) | 2520 | 2449 | 2441 | 2404 | 2457 |

|  | C. Ex. 6 | C. Ex. 7 | C. Ex. 8 | C. Ex. 9 | C. Ex. 10 |
|---|---|---|---|---|---|
| COMPOSITIONS | | | | | |
| PPE | 29.01 | 29.01 | 29.01 | 29.01 | 29.01 |
| SEBS | 6.50 | 6.50 | 6.50 | 6.50 | 6.50 |
| Citric acid | 0.70 | 0.70 | 0.70 | 0.70 | 0.70 |
| PELTP | 0.50 | 0.50 | 0.50 | 0.50 | 0.50 |
| Antioxidant | 0.50 | 0.50 | 0.50 | 0.50 | 0.50 |
| CuI/KI/PA | 0.50 | 0.50 | 0.50 | 0.50 | 0.50 |
| PETS | 0.30 | 0.30 | 0.30 | 0.30 | 0.30 |
| PA-6,6 | 61.88 | 61.88 | 61.88 | 61.88 | 61.88 |

TABLE 2-continued

| | | | | | |
|---|---|---|---|---|---|
| Carbon black | 0.2 | 0.2 | 0.2 | 0.2 | 0.2 |
| Stearyl erucamide | 0 | 0 | 0 | 0 | 0 |
| Ethylene bis(stearamide) | 0 | 0 | 0 | 0 | 0 |
| Ca stearate | 0.1 | 0.2 | 0.3 | 0.5 | 0 |
| Ca montanate | 0 | 0 | 0 | 0 | 0.1 |
| Partially saponified $C_{24}$-$C_{34}$ fatty acid esters | 0 | 0 | 0 | 0 | 0 |
| PROPERTIES | | | | | |
| Mold release pressure (kg/cm$^2$) | 15.6 | 12.5 | 11.4 | 10.0 | 14.1 |
| Change in mold release pressure vs. C. Ex. 1 (%) | −34 | −47 | −52 | −58 | −41 |
| Streaking after 20 minute dwell time? | yes | — | — | — | yes |
| Percent of area with streaking defect (%) | 88 | — | — | — | 57 |
| Melt flow index at 280° C., 5 kg (g/10 min) | 76 | 66 | 77 | 80 | 78 |
| Change in melt flow index vs. C. Ex. 1 (%) | 48 | 29 | 50 | 55 | 52 |
| Heat distortion temperature at 4.6 kg (° C.) | 195 | 197 | 194 | 195 | 195 |
| Notched Izod impact strength at 23° C. (J/m) | 199 | 151 | 155 | 134 | 211 |
| Tensile strength at 23° C. (MPa) | 64 | 65 | 63 | 64 | 66 |
| Flexural strength at 23° C. (MPa) | 93 | 91 | 91 | 92 | 91 |
| Flexural modulus at 23° C. (MPa) | 2432 | 2498 | 2472 | 2482 | 2424 |

| | C. Ex. 11 | Ex. 1 | Ex. 2 | Ex. 3 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Stearyl erucamide | 0 | 0 | 0 | 0 |
| Ethylene bis(stearamide) | 0 | 0 | 0 | 0 |
| Ca stearate | 0 | 0 | 0 | 0 |
| Ca montanate | 0.3 | 0 | 0 | 0 |
| Partially saponified $C_{24}$-$C_{34}$ fatty acid esters | 0 | 0.1[1] | 0.3[1] | 0.3[2] |
| PROPERTIES | | | | |
| Mold release pressure (kg/cm$^2$) | 11.4 | 18.2 | 13.7 | 11.1 |
| Change in mold release pressure vs. C. Ex. 1 (%) | −52 | −23 | −42 | −53 |
| Streaking after 20 minute dwell time? | yes | — | nil | nil |
| Percent of area with streaking defect (%) | 88 | — | 5 | 5 |
| Melt flow index at 280° C., 5 kg (g/10 min) | 78 | 72 | 75 | 74 |
| Change in melt flow index vs. C. Ex. 1 (%) | 51 | 40 | 46 | 44 |
| Heat distortion temperature at 4.6 kg (° C.) | 193 | 195 | 193 | 194 |
| Notched Izod impact strength at 23° C. (J/m) | 218 | 191 | 225 | 205 |
| Tensile strength at 23° C. (MPa) | 66 | 66 | 66 | 64 |
| Flexural strength at 23° C. (MPa) | 91 | 92 | 92 | 91 |
| Flexural modulus at 23° C. (MPa) | 2420 | 2445 | 2441 | 2418 |

[1] LICOWAX OP P
[2] LUWAX OP P

EXAMPLES 4-7, COMPARATIVE EXAMPLES 12-30

These examples illustrate screening of several mold release agents under two abusive molding conditions. Compositions are summarized in Table 3, where component amounts are expressed in units of parts by weight.

The compositions were compounded as described in the previous working examples. Injection molding was used to form plaques having a surface area of 2.0 by 3.5 inches. Injection molding utilized a Van Dorn 85T (85 ton) molding machine, a barrel temperature of 300° C. and a mold tool temperature of 80° C. The thermoplastic composition was held at 300° C. for a "dwell time" of either ten or twenty minutes before the first sample was molded. These are abusive molding conditions intended to favor the formation of silver streaks.

For streaking evaluation, the surface area of each plaque was divided into a grid of 28 squares (4 by 7), and the percent of squares per plaque exhibiting streaking was noted. For example, on the plaque molded from Comparative Example 12 using a dwell time of 10 minutes, 10 of the 28 squares (or 36% of the squares) exhibited streaking.

The results show that many of the compositions performed poorly by exhibiting a high degree of streaking even under the less abusive 10 minute condition. These poorly performing samples included Comparative Example 12 (no mold release agent), Comparative Examples 13 and 14 (with calcium stearate), Comparative Examples 15 and 16 (with stearic acid), Comparative Examples 17 and 18 (with stearyl stearate), Comparative Example 22 (with 0.3 parts by weight of SA0830), and Comparative Example 28 (with 0.3 parts by weight of calcium montanate). Better performance (streaking on less than 10% area) under the 10 minute condition was exhibited by Examples 4 and 5 (with partially saponified stearate esters), Examples 6 and 7 (with partially saponified $C_{24}$-$C_{34}$ fatty acid esters), Comparative Example 19 (with 0.1 parts by weight complex ester), and Comparative Examples 29 and 30 (with $C_{24}$-$C_{34}$ fatty acid esters).

Eight of the compositions were also tested under the very abusive 10 minute condition. Under that very abusive molding condition, Example 6 (with 0.3 parts by weight partially saponified $C_{24}$-$C_{34}$ fatty acid esters) performed best with streaking on 43%. of the area examined. The seven other compositions tested showed streaking on 100% of the area examined.

The excellent performance of compositions with partially saponified $C_{24}$-$C_{34}$ fatty acid esters compositions was particularly unexpected given that the compositions with unsaponified and fully saponified $C_{24}$-$C_{34}$ fatty acid esters did not perform as well.

TABLE 3

| | C. Ex. 12 | C. Ex. 13 | C. Ex. 14 | C. Ex. 15 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Ca stearate | 0 | 0.1 | 0.3 | 0 |
| Stearic acid | 0 | 0 | 0 | 0.1 |
| Stearyl stearate | 0 | 0 | 0 | 0 |
| Partially saponified stearate esters | 0 | 0 | 0 | 0 |
| Complex ester | 0 | 0 | 0 | 0 |
| SA0830 | 0 | 0 | 0 | 0 |
| Glyceryl distearate | 0 | 0 | 0 | 0 |
| Long-chain fatty ketone | 0 | 0 | 0 | 0 |
| Ca montanate | 0 | 0 | 0 | 0 |
| Partially saponified $C_{24}$-$C_{34}$ fatty acid esters | 0 | 0 | 0 | 0 |
| $C_{24}$-$C_{34}$ fatty acid esters | 0 | 0 | 0 | 0 |
| PROPERTIES | | | | |
| Percent of area with streaking defect after 10 minute dwell time (%) | 36 | 29 | 64 | 50 |
| Percent of area with streaking defect after 20 minute dwell time (%) | 100 | 100 | — | — |

| | C. Ex. 16 | C. Ex. 17 | C. Ex. 18 | Ex. 4 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Ca stearate | 0 | 0 | 0 | 0 |
| Stearic acid | 0.3 | 0 | 0 | 0 |
| Stearyl stearate | 0 | 0.1 | 0.3 | 0 |
| Partially saponified stearate esters | 0 | 0 | 0 | 0.1 |
| Complex ester | 0 | 0 | 0 | 0 |
| SA0830 | 0 | 0 | 0 | 0 |
| Glyceryl distearate | 0 | 0 | 0 | 0 |
| Long-chain fatty ketone | 0 | 0 | 0 | 0 |
| Ca montanate | 0 | 0 | 0 | 0 |
| Partially saponified $C_{24}$-$C_{34}$ fatty acid esters | 0 | 0 | 0 | 0 |
| $C_{24}$-$C_{34}$ fatty acid esters | 0 | 0 | 0 | 0 |
| PROPERTIES | | | | |
| Percent of area with streaking defect after 10 minute dwell time (%) | 61 | 36 | 32 | 7 |
| Percent of area with streaking defect after 20 minute dwell time (%) | — | — | — | — |

| | Ex. 5 | C. Ex. 19 | C. Ex. 20 | C. Ex. 21 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Ca stearate | 0 | 0 | 0 | 0 |
| Stearic acid | 0 | 0 | 0 | 0 |
| Stearyl stearate | 0 | 0 | 0 | 0 |
| Partially saponified stearate esters | 0.3 | 0 | 0 | 0 |
| Complex ester | 0 | 0.1 | 0.3 | 0 |
| SA0830 | 0 | 0 | 0 | 0.1 |
| Glyceryl distearate | 0 | 0 | 0 | 0 |
| Long-chain fatty ketone | 0 | 0 | 0 | 0 |
| Ca montanate | 0 | 0 | 0 | 0 |
| Partially saponified $C_{24}$-$C_{34}$ fatty acid esters | 0 | 0 | 0 | 0 |
| $C_{24}$-$C_{34}$ fatty acid esters | 0 | 0 | 0 | 0 |
| PROPERTIES | | | | |
| Percent of area with streaking defect after 10 minute dwell time (%) | 7 | 7 | 14 | 11 |
| Percent of area with streaking defect after 20 minute dwell time (%) | 100 | — | 100 | — |

| | C. Ex. 22 | C. Ex. 23 | C. Ex. 24 | C. Ex. 25 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Ca stearate | 0 | 0 | 0 | 0 |
| Stearic acid | 0 | 0 | 0 | 0 |
| Stearyl stearate | 0 | 0 | 0 | 0 |
| Partially saponified stearate esters | 0 | 0 | 0 | 0 |
| Complex ester | 0 | 0 | 0 | 0 |
| SA0830 | 0.3 | 0 | 0 | 0 |
| Glyceryl distearate | 0 | 0.1 | 0.3 | 0 |
| Long-chain fatty ketone | 0 | 0 | 0 | 0.1 |
| Ca montanate | 0 | 0 | 0 | 0 |
| Partially saponified $C_{24}$-$C_{34}$ fatty acid esters | 0 | 0 | 0 | 0 |
| $C_{24}$-$C_{34}$ fatty acid esters | 0 | 0 | 0 | 0 |

TABLE 3-continued

| PROPERTIES | | | | |
|---|---|---|---|---|
| Percent of area with streaking defect after 10 minute dwell time (%) | 25 | 14 | 11 | 18 |
| Percent of area with streaking defect after 20 minute dwell time (%) | — | — | 100 | — |

| | C. Ex. 26 | C. Ex. 27 | C. Ex. 28 | Ex. 6 |
|---|---|---|---|---|
| COMPOSITIONS | | | | |
| PPE | 29.01 | 29.01 | 29.01 | 29.01 |
| SEBS | 6.50 | 6.50 | 6.50 | 6.50 |
| Citric acid | 0.70 | 0.70 | 0.70 | 0.70 |
| PELTP | 0.50 | 0.50 | 0.50 | 0.50 |
| Antioxidant | 0.50 | 0.50 | 0.50 | 0.50 |
| CuI/KI/PA | 0.50 | 0.50 | 0.50 | 0.50 |
| PETS | 0.30 | 0.30 | 0.30 | 0.30 |
| PA-6,6 | 61.88 | 61.88 | 61.88 | 61.88 |
| Carbon black | 0.2 | 0.2 | 0.2 | 0.2 |
| Ca stearate | 0 | 0 | 0 | 0 |
| Stearic acid | 0 | 0 | 0 | 0 |
| Stearyl stearate | 0 | 0 | 0 | 0 |
| Partially saponified stearate esters | 0 | 0 | 0 | 0 |
| Complex ester | 0 | 0 | 0 | 0 |
| SA0830 | 0 | 0 | 0 | 0 |
| Glyceryl distearate | 0 | 0 | 0 | 0 |
| Long-chain fatty ketone | 0.3 | 0 | 0 | 0 |
| Ca montanate | 0 | 0.1 | 0.3 | 0 |
| Partially saponified fatty acid esters | 0 | 0 | 0 | 0.1[1] |
| $C_{24}$-$C_{34}$ fatty acid esters | 0 | 0 | 0 | 0 |
| PROPERTIES | | | | |
| Percent of area with streaking defect after 10 minute dwell time (%) | 18 | 14 | 36 | 4 |
| Percent of area with streaking defect after 20 minute dwell time (%) | 100 | — | — | — |

| | Ex. 7 | C. Ex. 29 | C. Ex. 30 |
|---|---|---|---|
| COMPOSITIONS | | | |
| PPE | 29.01 | 29.01 | 29.01 |
| SEBS | 6.50 | 6.50 | 6.50 |
| Citric acid | 0.70 | 0.70 | 0.70 |
| PELTP | 0.50 | 0.50 | 0.50 |
| Antioxidant | 0.50 | 0.50 | 0.50 |
| CuI/KI/PA | 0.50 | 0.50 | 0.50 |
| PETS | 0.30 | 0.30 | 0.30 |
| PA-6,6 | 61.88 | 61.88 | 61.88 |
| Carbon black | 0.2 | 0.2 | 0.2 |
| Ca stearate | 0 | 0 | 0 |
| Stearic acid | 0 | 0 | 0 |
| Stearyl stearate | 0 | 0 | 0 |
| Partially saponified stearate esters | 0 | 0 | 0 |
| Complex ester | 0 | 0 | 0 |
| SA0830 | 0 | 0 | 0 |
| Glyceryl distearate | 0 | 0 | 0 |
| Long-chain fatty ketone | 0 | 0 | 0 |
| Ca montanate | 0 | 0 | 0 |
| Partially saponified fatty acid esters | 0.3[1] | 0 | 0 |
| $C_{24}$-$C_{34}$ fatty acid esters | 0 | 0.1 | 0.3 |
| PROPERTIES | | | |
| Percent of area with streaking defect after 10 minute dwell time (%) | 7 | 4 | 4 |
| Percent of area with streaking defect after 20 minute dwell time (%) | 43 | — | 100 |

[1]LICOWAX OP P

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A compatibilized polyamide-poly(arylene ether) composition, comprising the product of melt blending components comprising:
    about 40 to about 75 weight percent of a polyamide;
    about 25 to about 55 weight percent of a poly(arylene ether);
    about 2 to about 10 weight percent of a hydrogenated block copolymer of an alkenyl aromatic monomer and a conjugated diene;
    about 0.2 to about 2 weight percent of a compatibilizing agent; and
    about 0.1 to about 1 weight percent of a partially saponified ester of a $C_{16}$-$C_{36}$ aliphatic carboxylic acid and a $C_2$-$C_{12}$ aliphatic alcohol;
    wherein all weight percents are based on the total weight of the compatibilized polyamide-poly(arylene ether) composition; and
    wherein the composition excludes filler.

2. The compatibilized polyamide-poly(arylene ether) composition of claim 1, wherein the $C_{16}$-$C_{36}$ aliphatic carboxylic acid comprises a $C_{16}$-$C_{24}$ aliphatic carboxylic acid.

3. The compatibilized polyamide-poly(arylene ether) composition of claim 1, wherein the $C_{16}$-$C_{36}$ aliphatic carboxylic acid comprises stearic acid.

4. The compatibilized polyamide-poly(arylene ether) composition of claim 1, wherein the $C_{16}$-$C_{36}$ aliphatic carboxylic acid comprises a $C_{24}$-$C_{36}$ aliphatic carboxylic acid.

5. The compatibilized polyamide-poly(arylene ether) composition of claim 1, wherein the $C_{16}$-$C_{36}$ aliphatic carboxylic acid comprises montanic acid.

6. The compatibilized polyamide-poly(arylene ether) composition of claim 1, wherein the $C_2$-$C_{12}$ aliphatic alcohol comprises a $C_2$-$C_{12}$ aliphatic diol.

7. The compatibilized polyamide-poly(arylene ether) composition of claim 1, wherein the $C_2$-$C_{12}$ aliphatic alcohol is selected from the group consisting of ethylene glycol, 1-methyl-1,3-propanediol, and mixtures thereof.

8. The compatibilized polyamide-poly(arylene ether) composition of claim 1, wherein the partially saponified ester comprises a fatty acid salt selected from the group consisting of a calcium salt of the $C_{16}$-$C_{36}$ aliphatic carboxylic acid, a sodium salt of the $C_{16}$-$C_{36}$ aliphatic carboxylic acid, a potassium salt of the $C_{16}$-$C_{36}$ aliphatic carboxylic acid, a zinc salt of the $C_{16}$-$C_{36}$ aliphatic carboxylic acid, a magnesium salt of the $C_{16}$-$C_{36}$ aliphatic carboxylic acid, an aluminum salt of the $C_{16}$-$C_{36}$ aliphatic carboxylic acid, and combinations thereof.

9. The compatibilized polyamide-poly(arylene ether) composition of claim 8, wherein the partially saponified ester comprises about 5 to about 60 weight percent of the fatty acid salt, based on the weight of the partially saponified ester.

10. The compatibilized polyamide-poly(arylene ether) composition of claim 1, wherein thermogravimetric analysis of the partially saponified ester in air over a temperature range of 25 to 700° C. yields a residue of about 1 to about 6 weight percent, based on the initial weight of the partially saponified ester.

11. The compatibilized polyamide-poly(arylene ether) composition of claim 1, wherein the polyamide has an amine end group concentration of about 40 to about 70 microequivalents per gram and a relative viscosity of about 30 to about 60.

12. The compatibilized polyamide-poly(arylene ether) composition of claim 1, wherein the hydrogenated block copolymer has an alkenyl aromatic content of about 20 to about 40 weight percent, based on the weight of the hydrogenated block copolymer.

13. The compatibilized polyamide-poly(arylene ether) composition of claim 1,
wherein the composition is the product of melt blending components comprising
about 55 to about 65 weight percent of the polyamide;
about 25 to about 35 weight percent of the poly(arylene ether);
about 4 to about 8 weight percent of the hydrogenated block copolymer;
about 0.4 to about 1 weight percent of the compatibilizing agent; and
about 0.2 to about 0.4 weight percent of the partially saponified ester;
wherein the polyamide comprises polyamide-6,6;
wherein the poly(arylene ether) comprises poly(2,6-dimethyl-1,4-phenylene ether);
wherein the hydrogenated block copolymer comprises a polystyrene-poly(ethylene-butylene)-polystyrene having a polystyrene content of about 20 to about 40 weight percent, based on the weight of the polystyrene-poly(ethylene-butylene)-polystyrene;
wherein the compatibilizing agent comprises citric acid;
wherein the $C_{16}$-$C_{36}$ aliphatic carboxylic acid comprises montanic acid;
wherein the $C_2$-$C_{12}$ aliphatic alcohol is selected from the group consisting of ethylene glycol, 1-methyl-1,3-propanediol, and mixtures thereof; and
wherein the partially saponified ester comprises a calcium salt of the $C_{16}$-$C_{36}$ aliphatic carboxylic acid.

14. A compatibilized polyamide-poly(arylene ether) composition, obtainable by a process comprising melt blending:
about 40 to about 75 weight percent of a polyamide;
about 25 to about 55 weight percent of a poly(arylene ether);
about 2 to about 10 weight percent of a hydrogenated block copolymer;
about 0.2 to about 2 weight percent of a compatibilizing agent; and
about 0.1 to about 0.5 weight percent of a partially saponified ester of a $C_{16}$-$C_{36}$ aliphatic carboxylic acid and a $C_2$-$C_{12}$ aliphatic alcohol;
wherein all weight percents are based on the total weight of the compatibilized polyamide-poly(arylene ether) composition; and
wherein the composition excludes filler.

15. An article comprising the compatibilized polyamide-poly(arylene ether) composition of claim 1.

16. An automotive under-the-hood component comprising the compatibilized polyamide-poly(arylene ether) composition of claim 11.

17. A method of reducing cosmetic imperfections in a surface of an injection molded article comprising a compatibilized polyamide-poly(arylene ether) composition, the method comprising:
injection molding a compatibilized polyamide-poly(arylene ether) composition to form an injection molded article; wherein the compatibilized polyamide-poly(arylene ether) composition is the product of melt blending components comprising
about 40 to about 75 weight percent of a polyamide;
about 25 to about 55 weight percent of a poly(arylene ether);
about 2 to about 10 weight percent of a hydrogenated block copolymer of an alkenyl aromatic monomer and a conjugated diene;
about 0.2 to about 2 weight percent of a compatibilizing agent; and
about 0.1 to about 1 weight percent of a partially saponified ester of a
$C_{16}$-$C_{36}$ aliphatic carboxylic acid and a $C_2$-$C_{12}$ aliphatic alcohol;
wherein all weight percents are based on the total weight of the compatibilized polyamide-poly(arylene ether) composition; and wherein the composition excludes filler.

18. The method of claim 17, wherein the polyamide has an amine end group concentration of about 40 to about 70 microequivalents per gram and a relative viscosity of about 30 to about 60.

19. The method of claim 17, wherein the hydrogenated block copolymer has an alkenyl aromatic content of about 20 to about 40 weight percent, based on the weight of the hydrogenated block copolymer.

20. The method of claim 17,
wherein the composition is the product of melt blending components comprising
about 55 to about 65 weight percent of the polyamide;
about 25 to about 35 weight percent of the poly(arylene ether);
about 4 to about 8 weight percent of the hydrogenated block copolymer;
about 0.4 to about 1 weight percent of the compatibilizing agent; and
about 0.2 to about 0.4 weight percent of the partially saponified ester;
wherein the polyamide comprises polyamide-6,6;
wherein the poly(arylene ether) comprises poly(2,6-dimethyl-1,4-phenylene ether);
wherein the hydrogenated block copolymer comprises a polystyrene-poly(ethylene-butylene)-polystyrene having a polystyrene content of about 20 to about 40 weight percent, based on the weight of the polystyrene-poly(ethylene-butylene)-polystyrene;
wherein the compatibilizing agent comprises citric acid;
wherein the $C_{16}$-$C_{36}$ aliphatic carboxylic acid comprises montanic acid;
wherein the $C_2$-$C_{12}$ aliphatic alcohol is selected from the group consisting of ethylene glycol, 1-methyl-1,3-propanediol, and mixtures thereof; and
wherein the partially saponified ester comprises a calcium salt of the $C_{16}$-$C_{36}$ aliphatic carboxylic acid.

* * * * *